Figure 7:
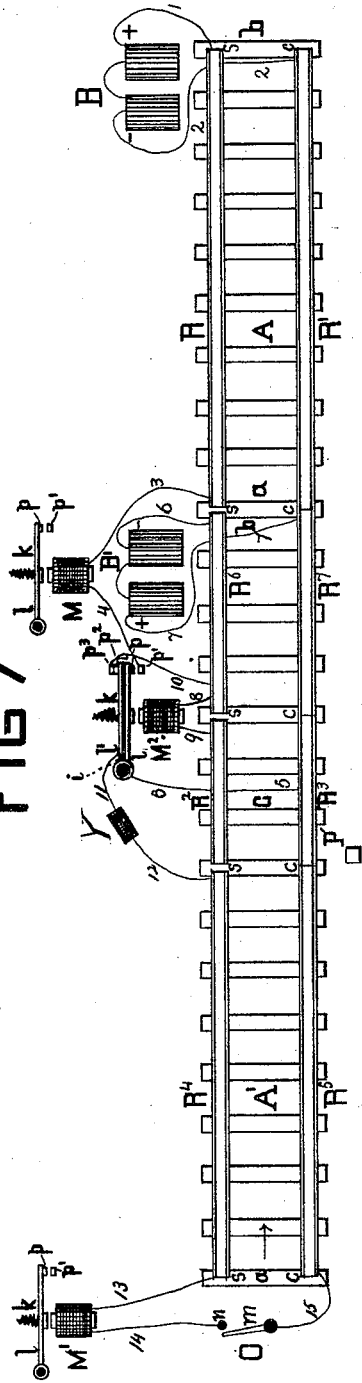

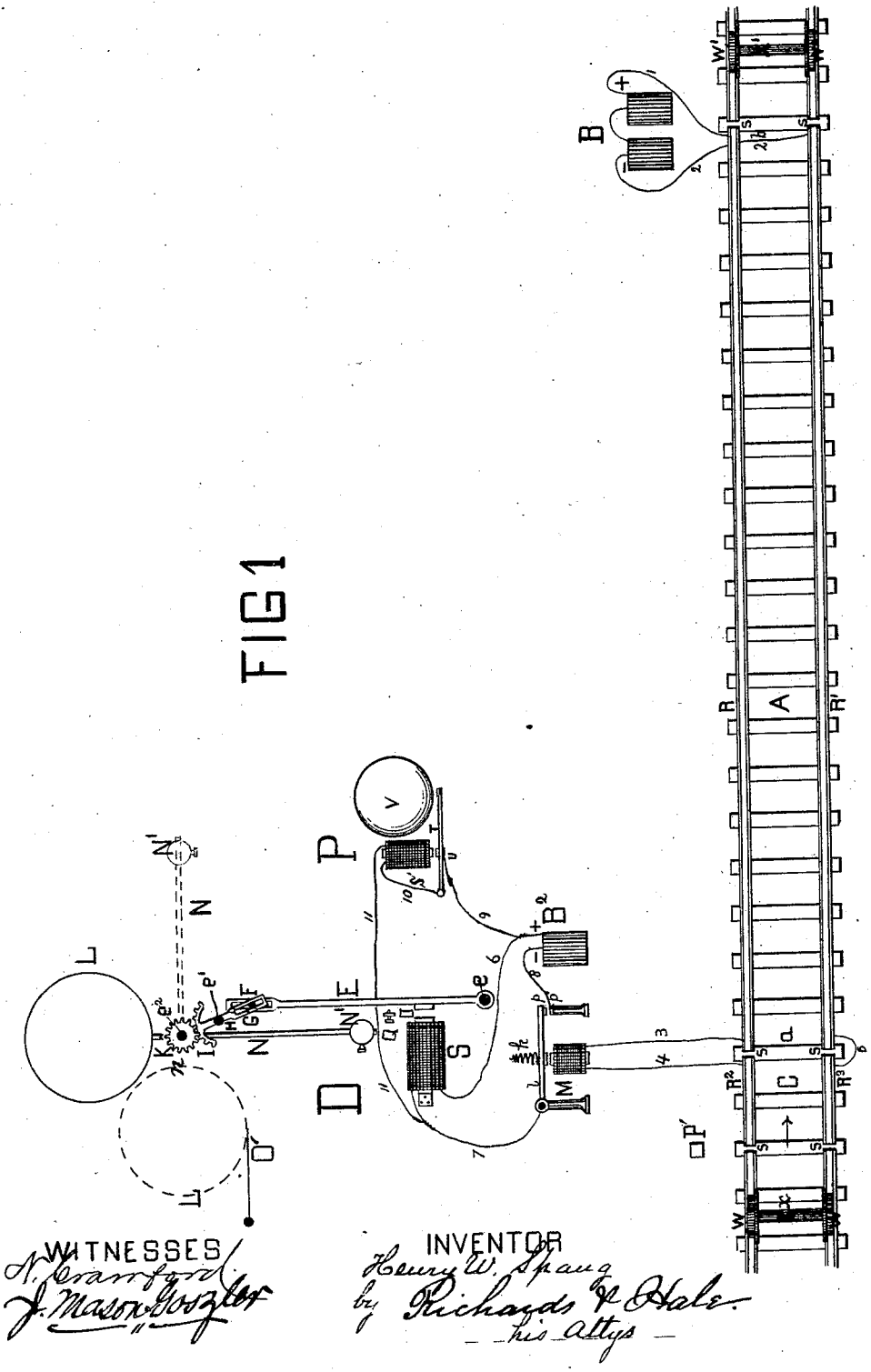

6 Sheets--Sheet 2.
H. W. SPANG.
Electric Railway-Signal.
No. 164,227.   Patented June 8, 1875.
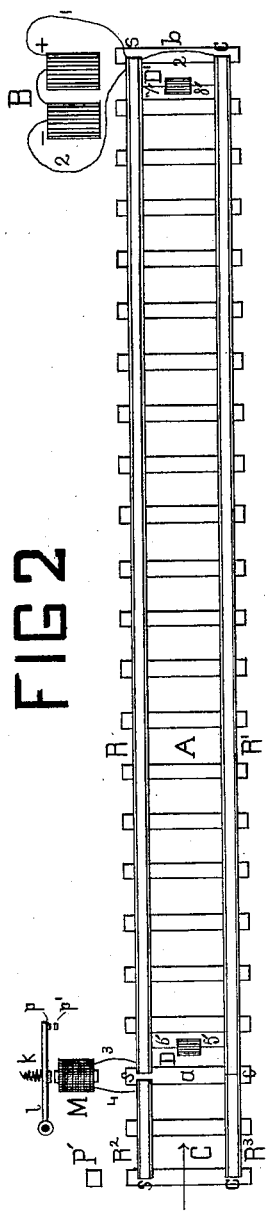
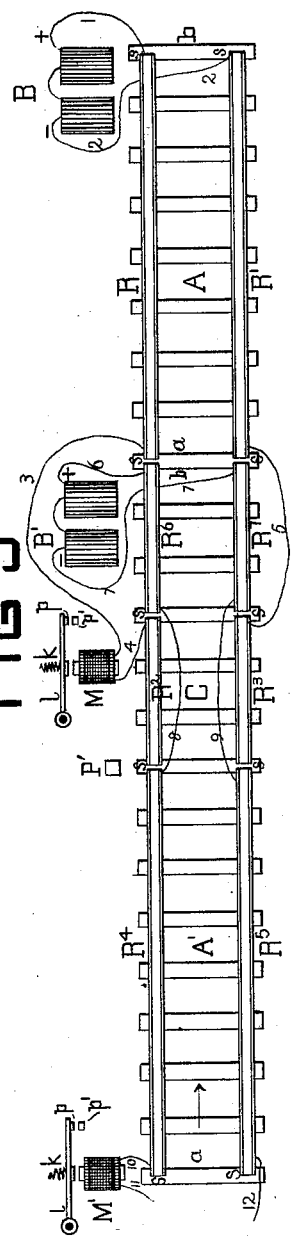
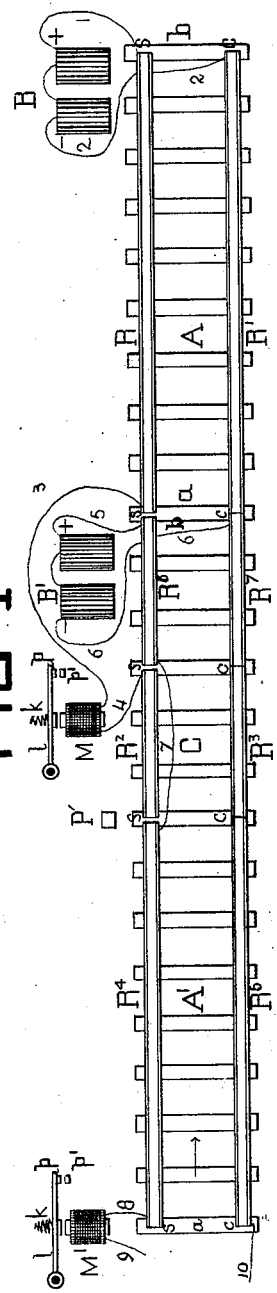
WITNESSES  
N. Crawford  
J. Mason Goszler
INVENTOR  
Henry W. Spang  
by Richards & Hale  
his Attys
THE GRAPHIC CO.PHOTO-LITH.39 & 41 PARK PLACE,N.Y.

6 Sheets--Sheet 3
H. W. SPANG.
Electric Railway-Signal.
No. 164,227.　　　　　　　　　　　　　Patented June 8, 1875.
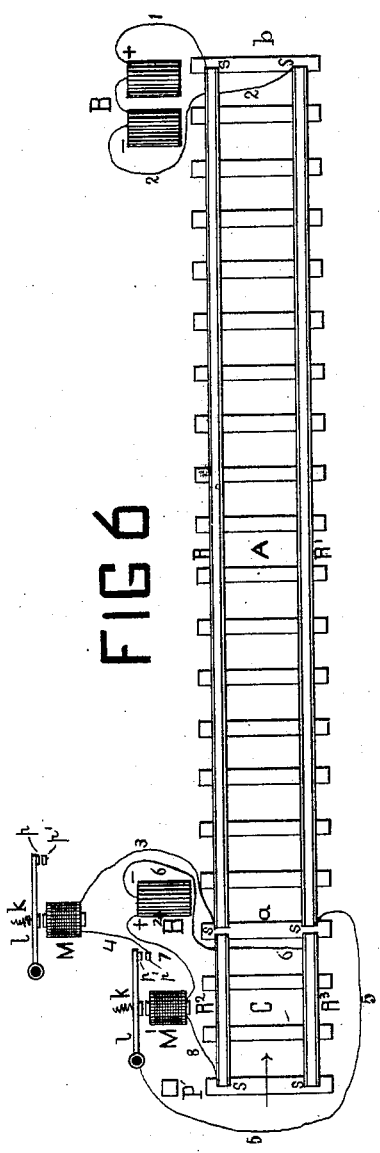
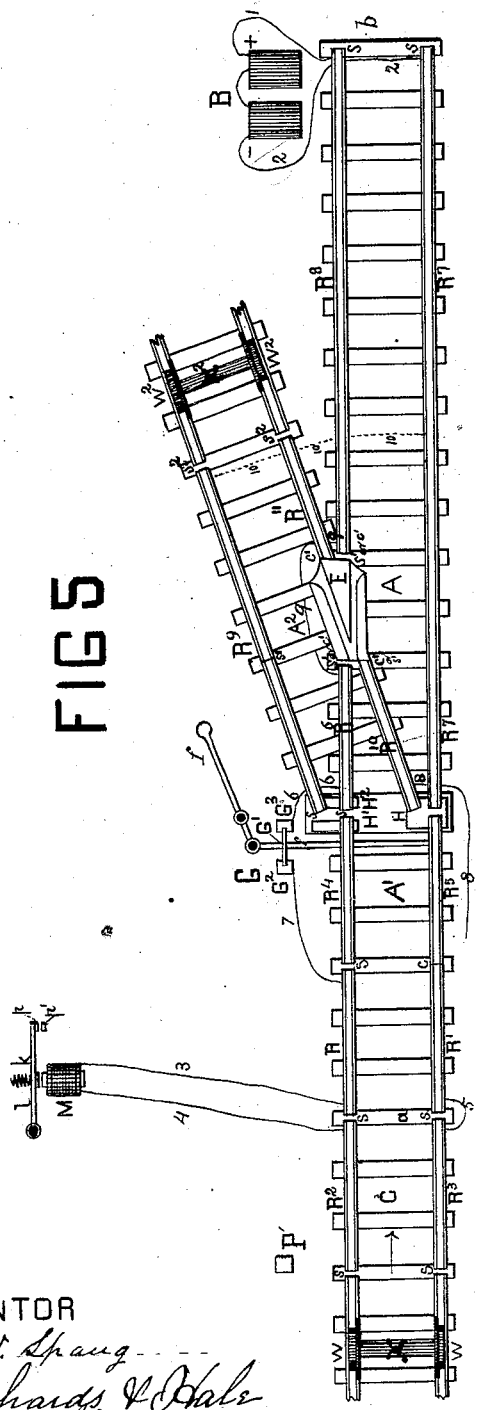
WITNESSES　　　INVENTOR 6 Sheets--Sheet 4.

H. W. SPANG.
Electric Railway-Signal.

No. 164,227.  Patented June 8, 1875.

WITNESSES  
N. Cranford  
J. Mason Goszler

INVENTOR  
Henry W. Spang  
by Richards & Hale  
his Attys.

THE GRAPHIC CO. PHOTO-LITH. 39 & 41 PARK PLACE, N.Y.

6 Sheets--Sheet 5.
H. W. SPANG.
Electric Railway-Signal.
No. 164,227. Patented June 8, 1875.
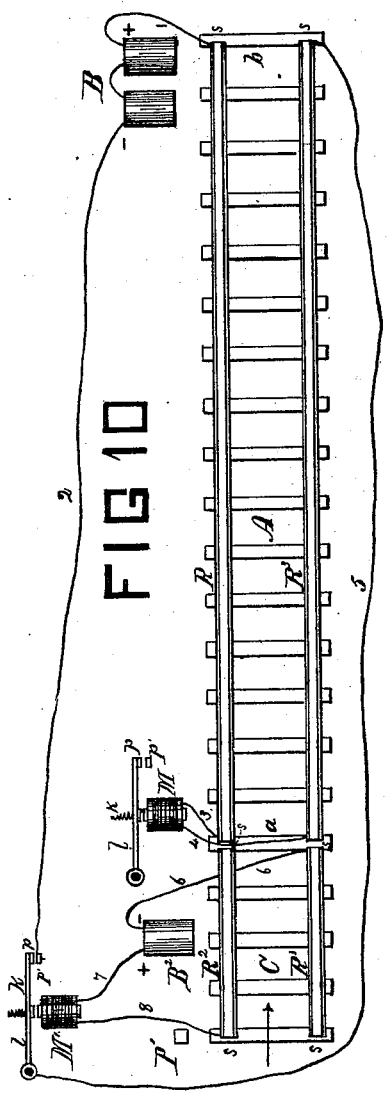
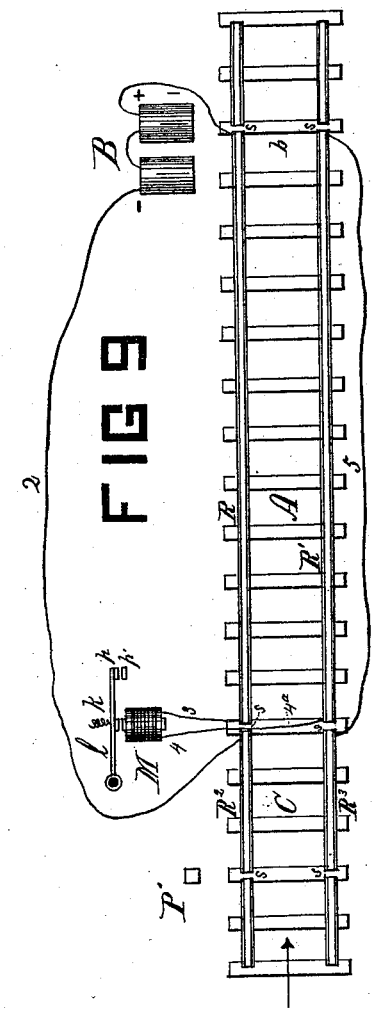
WITNESSES:
Philip W. Hale,
Joseph Shinn
INVENTOR
H. W. Spang,
per Richards & Hale,
Attorneys.
THE GRAPHIC CO.PHOTO-LITH.39 & 41 PARK PLACE,N.Y.

H. W. SPANG.
Electric Railway-Signal.
No. 164,227. Patented June 8, 1875.
6 Sheets--Sheet 6.
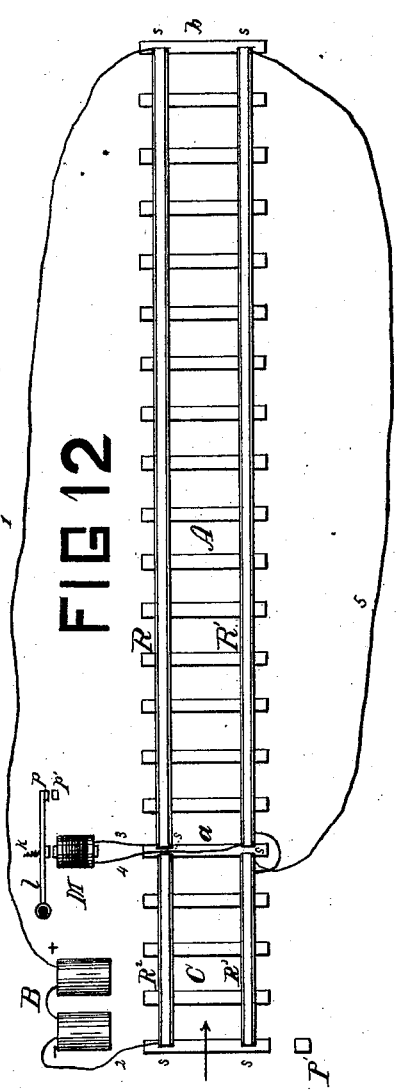
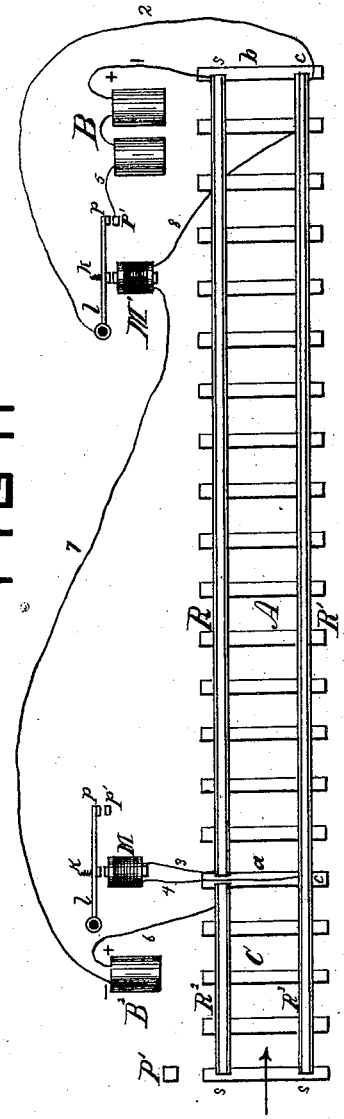
WITNESSES:
Philip W. Hale,
Joseph Shinn.
INVENTOR
H. W. Spang,
per Richards & Hale,
Attorneys.

UNITED STATES PATENT OFFICE.

HENRY W. SPANG, OF READING, PENNSYLVANIA.

IMPROVEMENT IN ELECTRIC RAILWAY-SIGNALS.

Specification forming part of Letters Patent No. 164,227, dated June 8, 1875; application filed February 4, 1874.

*To all whom it may concern:*

Be it known that I, HENRY W. SPANG, of Reading, in the county of Berks and State of Pennsylvania, have invented Improvements in Electric Circuits and Devices for Railway-Signal Apparatus, of which the following is a specification:

This invention consists in certain improved methods of combining and arranging a circuit closer or closers, or devices for controlling a circuit, wires, galvanic battery or batteries, and an electro or relay magnet or magnets, which control or operate a visual or audible signal, or both, with the rails of an insulated section of railroad-track, so that when the said section of track is clear, and not occupied by a locomotive or car, the electric circuit of the battery, which is connected with said rails at one end of the section of track, can be closed by an approaching locomotive or train, or a railroad employé at a signal or other station near or ahead of the opposite end of said section of track, and the electric current, passing over the rails of the entire section of track, will cause the electro or relay magnet or magnets to be charged and a safety-signal to be displayed or toned, or both, to the engineer of said locomotive or train, or to the railroad employé at a signal or other station. When the rails of said section of track are occupied by a locomotive or car moving or at rest, and are metallically connected by the wheels and axles thereof, or in any other manner whatever by a conductor of low resistance, or when a rail is removed or broken, a switch or draw-bridge displaced, a locomotive or car upon a branch track or siding, or a crossing at grade stands too near or across said section of track at the intersection therewith, or the wires or battery fail to perform their proper functions, it will be impossible for the said electric current to pass over the rails of the entire section of track and cause said electro or relay magnet or magnets to be charged, and, consequently, a safety-signal cannot be displayed or toned.

The invention consists, further, in the combination of a circuit closer and breaker or changer, operated or controlled by a railway-switch with the insulated rails of a section of a railroad-track, so that when the movable rails of a switch are in line with the main line of rails the circuit can be closed and a safety-signal can be displayed or toned, or both, and when in line with the rails of a branch track or siding the circuit will be broken or shunted, and cannot charge the magnet or magnets, and a safety-signal cannot be displayed or toned.

It consists, also, in the combination of the rails of a branch track, or siding, or crossing at grade, insulated for a proper distance, with the rails of a main track, so that the circuit will be extended from the main track to the insulated portion of the branch track, or siding, or crossing at grade at or near the intersection therewith, so that when the said insulated portion of branch track, or siding, or crossing at grade is occupied by a locomotive or car the circuit will be shunted and a safety-signal cannot be displayed or toned.

In the accompanying drawings, Figures 1, 2, 3, 4, 6, and 7 represent my invention as applied to an insulated section of a double-track railroad; Fig. 5, as applied to same, and also to a railway-switch, and an insulated portion of a branch track, or siding, or crossing at grade; Fig. 8, as applied to an insulated section of a single-track railroad; and Figs. 9, 10, 11, 12 are modifications of my invention applied to double-track railroad.

Figure 8:
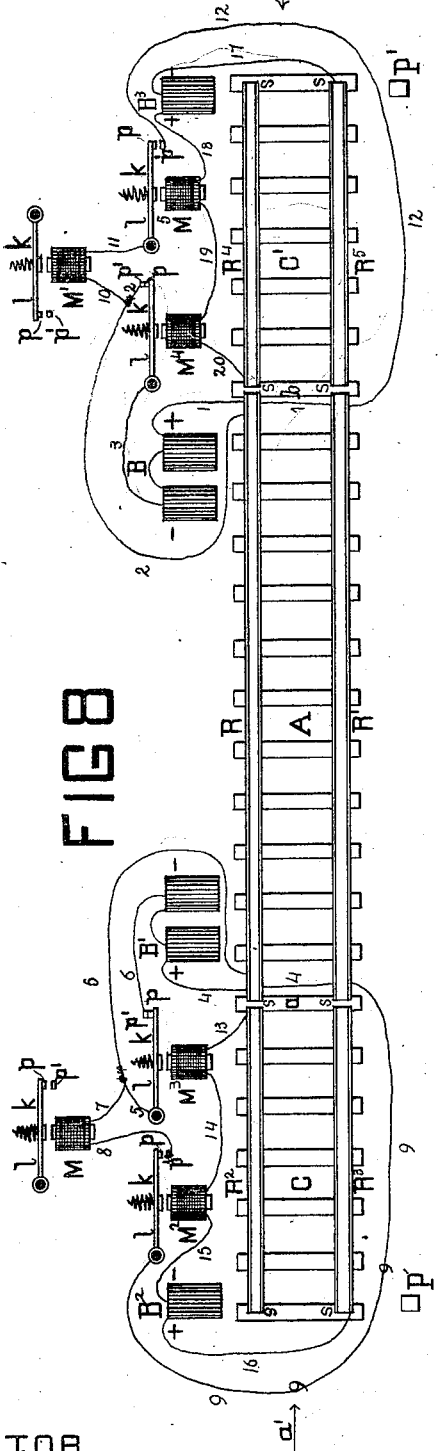

A, Figs. 1, 2, 5, 6, and 8, and A A$^1$, Figs. 3, 4, 7, are insulated sections of railroad-track a mile long, more or less, and $a$ and $b$ are the opposite ends of the respective sections. A$^1$, Fig. 5, is a railway-switch, and A$^2$, Fig. 5, an insulated portion or section of a branch track or siding, or it may be a crossing at grade. The divisions or sections of track or rails R, R$^1$, R$^2$, R$^3$, R$^4$, R$^5$, R$^6$, R$^7$, R$^8$, R$^9$, R$^{10}$, and R$^{11}$, should each have metallic continuity throughout its length by connecting the ends of rails by means of fish-joint plates, or other suitable metallic connections or conductors.

Letter $c$ indicates that the divisions of rails are metallically connected together, and letter $s$ that they are separated or insulated from each other; letter $c'$, that frog E in Fig. 5 is metallically connected with divisions of rails R$^{10}$ and R$^{11}$, and letter $s^1$ that said frog E is separated from divisions of rails R$^6$ and R$^8$, and letter $s^2$ that rails R$^9$ and R$^{11}$ of siding or branch track A$^2$ are insulated or separated from the remaining portion of said siding or branch track. The sections of track C, Figs. 1, 2, 3, 4, 5, 6, and 7, and sections C C¹, Fig. 8, are short, and the rails R² R³ or R⁴ R⁵ thereof can consist of one or more ordinary rails, and when the said rails are metallically connected together by the wheels W W united by their axle $x$ of a locomotive or car, or in any other manner whatever, they constitute a circuit-closer or part of the devices used for closing or controlling a circuit. In Figs. 1, 2, 5, and 6, the rails of short section or division of track C, and C C' of Fig. 8, are adjacent to the rails of insulated section of track A¹, and in Figs. 3, 4, and 7, the rails of said short section of track C constitute a part of adjacent insulated section of track A¹, and are ahead of and not adjacent to the rails of section of track A. Rail or rails R³ of section of track C can be separated or insulated from the adjacent rails, as shown in Figs. 1, 3, 5, 6, and 8, or can be metallically connected with the adjacent rails, as shown in Figs. 2, 4, and 7.

B, B¹, B², and B³ are galvanic batteries. B, Figs. 1, 2, 3, 4, 5, 6, 7, and 8, is connected with rails of section of track A at end $b$, and charges electro-magnet M, at or ahead of end $a$ of said section of track, when circuit is closed. B¹, Figs. 3, 4, 7, is connected to rails of section of track A¹ at end $b$, and charges electro-magnet M¹ at or ahead of end $a$ of said section of track; also, electro-magnet M² in Fig. 7, when circuit is closed. B¹, Fig. 8, is connected with rails of section of track A at end $a$, and charges electro-magnet M¹ at or beyond end $b$ of said section of track, when circuit is closed. B², Fig. 1, charges signal-operating magnets S and S¹ when circuit is closed. B², Fig. 6, is connected with rails R² R³ of section of track C, and charges electro-magnet M¹ when the circuit is closed between the said rails. B², Fig. 8, is connected to the rails R² R³ of section of track C, and charges two electro-magnets, M² and M³, or can charge one electro-magnet similar to magnet M² in Fig. 7, when circuit is closed between the said rails; and B³, Fig. 8, is connected to rails R⁴ R⁵ of section C', and also charges two relay or electro magnets, M⁴ M⁵, or can charge one electro-magnet similar to magnet M² in Fig. 7, when circuit is closed between the said rails.

D, Fig. 1, is an electro-magnetic semaphore signal apparatus, and is constructed as follows: E is a lever, which vibrates on or with the shaft $e$, and has an armature, J, attached, which is attracted by the cores of electro-magnet S when charged by circuit of battery B² being closed. The upper end F of said lever E is slotted. I is a toothed sector, which vibrates on or with shaft $e^1$, and gears with the pinion K, which revolves on or with shaft $e^2$. The arm H of the sector I is also slotted, like the end F of lever E, and connection is made between the two by means of a locking bolt or pin, G, which passes through both slots, and is secured to end F of lever E by screw-nuts or other suitable devices. N is an arm projecting from a hub which is fastened to and moves with the shaft $e^2$, and from the opposite side of said hub projects a short arm, $n$, to the end of which is fixed signal-disk L, and upon the arm N is arranged an adjustable weight, N'. The movement of the armature-lever E is regulated by the adjusting-screw Q, and the revolution of arm N and disk L is regulated and controlled by the position at which the locking-bolt G is set in the slots of the lever E and arm H. The disk L can be made of wire, and be covered with bunting or flannel of any color to indicate caution or danger, and when electro-magnet S is not charged arm N and disk or signal L stand vertically, owing to adjustable weight N' being heavier than said disk, and the said caution or danger signal disk is displayed through an opening in a signal box or house, and when magnet S is charged by electrical current of battery B² the armature J will be attracted by the cores of said electro-magnet, and thereby cause rods N, $n$, and disk L, through the described intermediate mechanism, to assume a horizontal position, as indicated by dotted lines in Fig. 1. The removal of disk L from the opening in the signal box or house indicates safety. To prevent any jarring of the mechanism, when the disk or signal assumes the horizontal position, as shown by the dotted lines, a spring or other yielding device, O', is so arranged as to cushion the said disk or signal at or about the point when the disk or signal comes to its horizontality, or when the lever E is nearly in contact with the adjusting screw or stop Q. The spring or other yielding device O' also serves to move the disk or signal L upward, and thereby assists the weight N' to place said disk L and rod N in a vertical position, which indicates caution or danger, when the circuit of battery B² is broken, and magnet S is not charged. Any other form of signal can be attached to arm $n$, instead of disk L. A disk or other signal or signals representing or indicating caution and safety can be attached to and be revolved by shaft $e^2$.

This signal apparatus is an improvement upon that shown in my patent No. 140,737, granted July 8, 1873, and is not subject to that jarring on the stoppage of movement in the signal, which is a serious objection to the said patented apparatus. In the patented apparatus the signal is operated both ways by electro-magnets, and a danger-signal may be prevented from being given when the circuit is broken, but in the present apparatus should a rail be removed from the insulated section A, or said section be occupied by a car or train, or the battery-current in any other manner shunted from the signal-operating magnet a caution or danger signal is automatically displayed by the action of weight N', which causes disk L to be displayed. And the weight and disk are so proportioned that said disk gradually rises until an equilibrium is established, when its stops without jar.

P is an electro-magnetic alarm-bell apparatus, with an automatic circuit closer and breaker, and is so arranged that when circuit of battery $B^2$ is closed, and magnet $S^1$ is thereby charged, it will cause armature-lever T to vibrate and strike bell or gong V, and constantly close and break said circuit between lever T and spring U, and tone or sound said bell or gong.

Referring to Fig. 1, when a locomotive or train, moving in the direction of the arrow ⇒→, arrives opposite the post P, which calls the attention of the engineer of said locomotive or train to the point at which the signal L should be removed from view, thereby indicating safety, and the section of track A is clear, and not occupied by a locomotive or car, and the wheels W W, united by their axle $x$, occupy the rails $R^2$ $R^3$, the circuit of battery B will be closed and flow from the positive (+) pole of said battery over wire 1, rails R, wire 3, electro-magnet M, wire 4, rails $R^2$, wheels W W, axle $x$, rails $R^3$, wire 5, rails $R^1$, and wire 2, to the negative (−) pole of the battery, thereby charging electro-magnet M and attracting armature-lever $l$, causing metallic point $p$ to come in contact with metallic point $p^1$, and thereby closing circuit of battery $B^2$, which, passing over wire 6, electro-magnet S, wire 7, lever $l$, points $p$ and $p^1$, and wire 8, charges electro-magnet S, and causes disk or signal L to be removed from view, indicating safety, or causes a safety-signal to be displayed, as hereinbefore explained. At the same time the current of battery $B^2$ will pass over wire 9, spring U, vibrating armature-lever T, wire 10, electro-magnet $S^1$, and wire 11, and cause bell or gong V to be toned or sounded, as hereinbefore explained.

Should the rails R $R^1$ be occupied by wheels $W^1$ $W^1$, united by their axle $x^1$, of a locomotive or car, or in any other manner be connected by a conductor of low resistance, and less than the resistance of electro-magnet M and intermediate conductors, the current of electricity from battery B will pass over wire 1, rails R, wheels $W^1$ $W^1$, axle $x^1$, or any other conductor, rails $R^1$, and wire 2, and the said current will not flow over and charge electro-magnet M when wheels W W, united by axle $x$, occupy rails $R^2$ $R^3$.

Should a rail of section of track A be removed or broken, or wires 1, 2, 3, 4, or 5 be broken, or battery B be out of order, or any connection in the circuit be broken, it will be also impossible to cause electro-magnet M to be charged by electrical current from battery B, and consequently the caution or danger signal or disk L will remain displayed, and the bell or gong V will not be toned or sounded, owing to the spring $k$ causing lever $l$ with point $p$ to be withdrawn from point $p^1$, and thereby opening the circuit of battery $B^2$ when electro-magnet M is not charged.

In Fig. 2 the electro-magnet M is charged when current of electricity from battery B flows over wire 1, rails R, wire 3, electro-magnet M, wire 4, rails $R^2$, wheels W W, axle $x$, rails $R^3$ $R^1$, and wire 2.

In Fig. 3 the electro-magnet M is charged when the current of electricity flows from battery B over wire 1, rails R, wire 3, electro-magnet M, wire 4, rails $R^2$, wheels W W, axle $x$, rails $R^3$, wire 5, rails $R^1$, and wire 2, and electro-magnet $M^1$ is charged when current of electricity from battery $B^1$ flows over wire 6, rails $R^6$, wire 8, rails $R^4$, wire 10, electro-magnet $M^1$, wire 11, thence over a circuit-closer of any description to wire 12, rails $R^5$, wire 9, rails $R^7$, and wire 7.

In Fig. 4 the electro-magnet M is charged when current of battery B flows over wire 1, rails R, wire 3, electro-magnet M, wire 4, rails $R^2$, wheels W W, axle $x$, rails $R^3$ $R^7$ $R^1$, and wire 2; and electro-magnet $M^1$ is charged when a current of electricity flows from battery $B^1$, over wire 5, rails $R^6$, wire 7, rails $R^4$, wire 8, electro-magnet $M^1$, wire 9, thence over a circuit-closer of any description to wire 10, rails $R^5$ $R^3$ $R^7$, and wire 6.

In Fig. 5, $R^4$ $R^5$ are movable rails of switch $A^1$, which can be placed in line with the main-line rails $R^6$ $R^7$, or rails $R^9$ $R^{10}$ of branch track or siding $A^2$, by means of rod $f$ and lever $f'$. Rails $R^5$ $R^7$ $R^{10}$ rest upon metallic plate H, rail $R^4$ upon plate $H^1$, and rails $R^6$ $R^9$ upon plate $H^2$. Rail $R^4$ and plate $H^1$ are separated or insulated from rails $R^6$ $R^9$ and plate $H^2$. Plates H, $H^1$, and $H^2$ should each have a rib, so as to prevent rail $R^4$ coming in contact with rails $R^6$ or $R^9$, or rail $R^5$ with rails $R^7$ or $R^{10}$. G is a circuit closer and breaker, and is controlled and actuated by the switch-lever $f'$ or rod $f$, or any other movable part of switch $A^1$. It consists of a metallic bar or conductor, $G^1$, attached to, but insulated from, rod $f$, in combination with plates or conductors $G^2$ $G^3$, and is so arranged that when rails $R^4$ $R^5$ are in line with main-line rails $R^6$ $R^7$ the bar or conductor $G^1$ will be in contact with plates $G^2$ $G^3$, and circuit is closed between wires 6 and 7, and when rails $R^4$ $R^5$ are in line with rails $R^9$ $R^{10}$ of branch track or siding $A^2$, the bar or conductor $G^1$ will be moved off the plates $G^2$ $G^3$, and the circuit is broken between wires 6 and 7.

When switch-rails $R^4$ $R^5$ are in line with main-line rails $R^6$ $R^7$ electro-magnet M is charged by the electrical current from battery B flowing over wire 1, rails $R^8$, wire 9, rails $R^6$, wire 6, conductors $G^3$ $G^1$ $G^2$, of circuit-closer G, wire 7, rails R, wire 3, electro-magnet M, wire 4, rails $R^2$, wheels W W, axle $x$, (of locomotive or train,) rails $R^3$, wire 5, rails $R^1$ $R^5$, plate H, rails $R^7$, and wire 2. The charging of said electro-magnet M causes the armature-lever $l$ to be attracted by the cores of said electro-magnet, and a caution or danger signal to be removed from view or a safety or "all-right" signal to be displayed, or an alarm-bell or gong to be sounded, or both, as hereinbefore explained.

When rails $R^4$ $R^5$ are in line with rails $R^9$ $R^{10}$ of branch track or siding $A^2$ the circuit of battery B will be broken, and consequently electro-magnet M cannot be charged for the purpose of actuating signals, as hereinbefore explained. Should the insulated section $A^2$ of a branch track or siding, or crossing at grade, be occupied by a locomotive or car, and thereby stand too near or across section of track A, the electrical current from battery B will flow over wire 1, rails $R^8$, wire 9, rails $R^6$, plate $H^2$, rails $R^9$, wheels $W^2$ $W^2$, axle $x^2$, of said locomotive or car, to rails $R^{11}$, frog E, rails $R^{10}$, plate H, rails $R^7$, and wire 2, and will not flow over magnet M when rails $R^2$ $R^3$ are occupied by wheels W W, united by axle $x$, and consequently said electro-magnet M will not be charged for the purpose of displaying or sounding a safety-signal, as hereinbefore explained. Should the rails $R^5$ $R^7$ $R^{10}$ not make good metallic connection with the plate H, owing to dirt and grease accumulating between said rails and plate, it will be necessary to connect wire 8 to rail $R^5$, and also to rails $R^7$ and $R^{10}$; and for the purpose of maintaining a good connection between rails $R^6$ and $R^9$ wire 6 can also be connected to rail $R^9$, in addition to being connected to rail $R^6$.

In place of the devices shown and described for closing and breaking circuit between wires 6 and 7, any other suitable device or devices can be substituted, and in place of plate H two plates similar to $H^1$ $H^2$ can be substituted, so as to separate or insulate rail $R^5$ from rails $R^7$ and $R^{10}$, and the said insulated rails $R^5$ and $R^7$ can be connected to a circuit closer and breaker similar to G, so that when switch-rails $R^4$ $R^5$ are in line with rails $R^9$ $R^{10}$ the circuit between rails $R^5$ and $R^7$ will be broken, as well as that between rails R and $R^6$.

In place of circuit closer and breaker G a circuit-changer can be substituted, so that when rails $R^4$ $R^5$ are in line with rails $R^6$ $R^7$ the circuit between rails R and $R^6$ will be closed, and electro-magnet M can be charged, and a safety-signal displayed or toned, or both. And when rails $R^4$ $R^5$ are in line with rails $R^9$ $R^{10}$, the circuit between rails $R^6$ and $R^7$ will be closed, and circuit of battery B will be shunted when rails $R^2$ $R^3$ are occupied by a car or locomotive, and consequently electro-magnet M cannot be charged for the purposes hereinbefore explained. Should the frog E be so constructed that it will be impossible to separate or insulate rail $R^8$ from rail $R^{11}$, it will be necessary to metallically connect rails $R^6$ and $R^8$ with frog E, and separate or insulate rail $R^{10}$ from frog E, and, also, to divide section of rails $R^9$ into two parts by a separation or insulation of said rails at $S^3$, and that portion of rails $R^9$ between $S^2$ and $S^3$ should be connected by a wire or other conductor, 10, with rails $R^7$, as shown by dotted lines, so that when any part of section $A^2$ of branch track or siding is occupied by a locomotive or car the circuit of battery B will be closed or short-circuited, and electro-magnet M cannot be charged, and consequently a safety-signal will not be displayed or sounded. Frog E can also be metallically connected to all the rails $R^6$, $R^8$, $R^{10}$, and $R^{11}$, by having rail $R^{10}$ insulated or separated from plate H, and rails $R^7$ $R^5$ and rail $R^9$ separated or insulated from plates $H^2$ $H^1$, and rails $R^6$ $R^4$, and connecting rails $R^7$ and $R^9$ by wire 10.

In Fig. 6, the electro-magnet $M^1$, battery $B^2$, and rails $R^2$ $R^3$ of section of track C, when occupied by wheels W W, united by axle $x$, constitute the devices for closing or controlling the circuit of battery B and electro-magnet M, which are connected to rails of section of track A, the electro-magnet $M^1$ being charged by the current from battery $B^2$, flowing over wire 7, electro-magnet $M^1$, wire 8, rails $R^2$, wheels W W, axle $x$, rails $R^3$, and wire 6, and attracts armature-lever $l$ of said electro-magnet $M^1$, and causes electro-magnet M to be charged by the current of battery B flowing over wire 1, rails R, wire 3, electro-magnet M, wire 4, points $p$ $p^1$, and armature-lever $l$ of magnet $M^1$, wire 5, rails $R^1$, and wire 2, when said section of track A is clear and not occupied by a locomotive or train.

In Fig. 7, battery $B^1$, electro-magnet $M^2$, and rails $R^6$ $R^7$ also $R^2$ $R^3$ of section of track $A^1$, when occupied by wheels W W united by axle $x$, constitute the devices for closing or controlling the circuit of battery B and electro-magnet M, which are connected to rails of section of track A. The electro-magnet $M^2$ has two levers or conductors, $l$ and $l'$, attached to each other by hard-rubber screws, and insulated from each other by a strip of hard rubber, $i i$, or other insulating material. They are so arranged that when magnet $M^2$ is not charged spring $k$ will cause lever or conductor $l$ to break circuit between points $p$ and $p^1$, and lever or conductor $l'$ to close circuit between points $p^2$ $p^3$, and when said magnet is charged lever $l'$ will break circuit between points $p^2$ $p^3$, and lever $l$ will close circuit between points $p$ $p^1$. When rails $R^2$ $R^3$ are occupied by wheels W W united by axle $x$ or by a locomotive or car, the electrical current from battery $B^1$, flowing over wire 7, rails $R^7$ $R^3$, wheels W W, axle $x$, rails $R^2$, wire 9, electro-magnet $M^2$, wire 8, rails $R^6$, and wire 6, and causing the cores of said electro-magnet to attract armature-lever $l$, thus removing point $p^2$ from point $p^3$, and so breaking circuit between wires 10 and 11, and at same time bringing point $p$ in contact with point $p^1$, closing circuit between wires 4 and 5 over lever $l$, and thereby causing electro-magnet M to be charged by current of electricity flowing from battery B over wire 1, rails R, wire 3, electro-magnet M, wire 4, points $p^1$ $p$, and lever $l$ of magnet $M^2$, wire 5, rails $R^3$ $R^7$ $R^1$, and wire 2, and a safety-signal to be displayed or toned, or both, when said section of track A is clear and not occupied by a locomotive or car.

O is an ordinary circuit-closer, consisting of a metallic lever or spring, $m$, and metallic plate or base $n$, and can be operated by a person, locomotive, or train, and electro-magnet $M^1$ is charged by current of electricity from battery $B^1$ flowing over wire 7, rails $R^7$ $R^3$ $R^5$, wire 15, lever $m$, base $n$, wire 14, electro-magnet $M^1$, wire 13, rails $R^4$, wire 12, resistance-coil Y, wire 11, lever or conductor $l'$, points $p^2$ $p^3$, wire 10, rails $R^6$, and wire 6, when section of track $A^1$, including the division or short section of track C, is clear and not occupied by a locomotive or car.

The object of the resistance-coil Y, Fig. 7, is to enable magnet $M^2$ to be charged by battery $B^1$ as soon as the first pair of wheels and axle of a locomotive or train moving in direction of arrow ⇒→ occupy rails $R^2$ $R^3$ of short section C, and while rails $R^4$ $R^5$ are occupied at the same time by wheels and axles of the other or rear part of said locomotive or train. The resistance of coil Y is about the same as the resistance of magnet $M^2$, and when rails $R^2$ $R^3$ are occupied by wheels and axles of the front part of a locomotive or train, and rails $R^4$ $R^5$ by wheels and axles of the rear part of said locomotive or train, the current of battery $B^1$ flows over wire 7, rails $R^7$ $R^3$, said front wheels and axle, rails $R^2$, wire 9, magnet $M^2$, wire 8, rails $R^6$, and wire 6, and also over rails $R^5$, the said rear wheels and axles, rails $R^4$, wire 12, resistance-coil Y, wire 11, lever $l'$, points $p^2$ $p^3$, and wire 10.

If the resistance-coil Y and wire 12 were omitted, and lever $l'$ connected to rail $R^4$ by wire 11, the current of battery $B^1$ would then flow over the circuit of least resistance, viz., wire 7, rails $R^7$ $R^3$ $R^5$, rear wheels and axles of the locomotive or train, wire 11, lever $l'$, points $p^2$ $p^3$, wire 10, rails $R^6$, and wire 6, and would not flow over the circuit of greater resistance, as before described, by which a portion of said current would be directed over the coil of electro-magnet $M^2$.

Rails $R^3$ can be insulated from rails $R^5$, and the circuit between them can also be closed and opened by means of two wires attached to the rails $R^3$ $R^5$, and to a lever and points similar to wires 10 11 with rails $R^4$ $R^6$, and lever $l'$ and points $p^2$ $p^3$ of electro-magnet $M^2$.

In Fig. 8, the battery $B^2$, electro-magnets $M^2$ $M^3$, and rails $R^2$ $R^3$, when connected metallically by the wheels and axles of a car or locomotive, constitute the devices for breaking the circuit of battery $B^1$, and at same time closing circuit of battery B, and thereby charging electro-magnet M when section of track A is clear and not occupied by a car or locomotive.

The battery $B^3$ and electro-magnets $M^4$ $M^5$ and rails $R^4$ $R^5$, when occupied by wheels and connecting-axles of a car or locomotive, constitute the devices for breaking circuit of battery B, and at same time closing circuit of battery $B^1$, and thereby charging electro-magnet $M^1$ when section of track A is clear and not occupied by a car or locomotive.

When a locomotive or train moves in the direction of arrow $a^1$ ⇒→, and the wheels and axles thereof metallically connect rails $R^2$ $R^3$ of section of track C, the circuit of battery $B^2$ will be closed, and the electrical current passing over wire 16, rails $R^3$, the wheels and axles, rails $R^2$, wire 13, electro-magnet $M^3$, wire 14, electro-magnet $M^2$, and wire 15, thereby charge electro-magnets $M^3$ and $M^2$, causing lever $l$ of magnet $M^3$ and point $p$ to be removed from point $p^1$, and circuit of battery $B^1$ to be broken, and at same time lever $l$ and point $p$ of magnet $M^2$ to come in contact with point $p^1$, and close circuit between them, when, should sections of track A and C' be clear and not occupied by a locomotive or car, the electro-magnet M will be charged by the electrical current from battery B flowing over wire 1, rails $R^1$, wire 9, lever $l$, and points $p$ $p^1$ of magnet $M^2$, wire 8, magnet M, wires 7 5, rails R, wire 2, points $p^1$ $p$ and lever $l$ of magnet $M^4$, and wire 3, and thereby cause a safety-signal to be displayed or toned, or both, as hereinbefore shown and described.

In the same manner, when a locomotive or train moves in the direction of arrow $a^2$ ⇒→, a similar arrangement of devices, located at the opposite end of section of track A to that just described, is operated.

Instead of two electro-magnets, $M^2$ $M^3$, or $M^4$ $M^5$, a single electro-magnet, similar to $M^2$ in Fig. 7, with its double armature-lever, can be substituted, so as to break circuit of battery $B^1$ and close circuit of battery B at the same time, or vice versa, when magnet $M^2$ or $M^4$ is charged by battery $B^2$ or $B^3$.

The earth should be removed from the rails $R^2$ $R^3$, Figs. 1, 3, 5, and 6, and from $R^2$ $R^3$ and $R^4$ $R^5$, Fig. 8, and from $R^2$, Figs. 2, 4, and 7, so that there will be as little escape or ground of the electrical current as possible in wet or damp weather; and should the escape or ground, during wet weather, from or between said rails be such as to require magnet M, Figs. 1, 2, 3, 4, and 5, $M^1$, Figs. 3 and 4, and $M^2$, Fig. 7, to be adjusted high, it will be necessary to connect resistance-coil D with rails of section of track A or $A^1$ at end $a$ by wires 5' 6', as shown in Fig. 2, and thereby close or shunt circuit of battery B or $B^1$ in wet and all kinds of weather, and enable the electro-magnet M, Figs. 1, 2, 3, 4, 5, $M^1$, Figs. 3, 4, and $M^2$, Fig. 7, to have a medium adjustment of their armature-levers during all kinds of weather.

The resistance-coil D is a much better conductor than the moist earth and sills between the rails $R^2$ and $R^3$, and consequently the electrical current will flow over coil D, and not over the moist earth and sills between said rails, and therefore will not charge the electro-magnets M, $M^1$, or $M^2$ in wet or damp weather, except when rails $R^2$ $R^3$ are connected metallically by wheels and axles of a car or locomotive, or otherwise. The resistance of coil D is greater than the resistance of electro-magnets, M, $M^1$ or $M^2$, and when rails $R^2$ $R^3$, Figs. 1, 2, 3, 4, 5, and 7, are occupied by the wheels and axles of a locomotive or train, and section of track A, or rails $R^6$ $R^7$ of section of track $A^1$, Fig. 7, are clear, and not occupied, the current of battery B will flow over and charge electromagnet M, or battery $B^1$ will charge electromagnet $M^1$ or $M^2$, Fig. 7, as the said magnets and wheels and axles offer less resistance to the current than coil D. Coil D will also serve to protect magnets M $M^1$, or magnet $M^2$ Fig. 7; and coil $D'$, which is attached to rails of section of track A or $A^1$ at end $b$, by wires $7'$ $8'$, will protect battery B or $B^1$ from being damaged by lightning or atmospheric electricity, which may strike the rails of section of track A or $A^1$. The resistance of coil $D'$ is also greater than the resistance of magnet M, and said coil will also serve to prevent said magnet from being charged during wet or damp weather, and a safety-signal thereby given, should a rail be removed or broken, or switch misplaced. Coil D can be connected to rail $R^1$ and wire 3, or to wires 3 and 5, Fig. 1, and coil $D'$ to wires 1 and 2, instead of connecting said coils to rails R $R^1$ of section of track A.

During wet and damp weather the current from battery B escapes freely from rails of section of track A to the earth, and consequently the current gradually becomes weak, and in order to use batteries of great electro-motive force, and maintain a uniform and strong current for several months, it will be necessary to connect magnet M to both lines of rails of section of track A, and not to circuit-closer or rails of section of track C, or other devices for closing circuit; and, also, to connect battery B direct with section of track C, or other circuit-closer, as shown in Figs. 9, 10, 11, 12, and thereby keep the circuit of battery B open, and allow but very little or no escape or ground from said battery, except when the said circuit is closed by said circuit-closer, operated by a locomotive, train, or person.

Instead of the devices hereinbefore shown and described for closing or controlling circuit of battery B or $B^1$, any other suitable devices may be employed.

A circuit-breaker, or devices for breaking circuit of battery B, can be placed between the short section of track or circuit closer C and the end $a$ of section of track A, or between circuit-closer $C'$ and end $b$ of said section of track, so that, after the safety-signal has been displayed to the engineer by locomotive or train passing over short section of track or circuit-closer C, and closing circuit of battery B, the said circuit will be broken by said locomotive or train before it enters upon section of track A, by passing over said circuit-breaker, or actuating devices for breaking circuit, and thereby saving the battery B, by keeping the circuit thereof closed only when section of track A is clear and not occupied, and only while a locomotive or train is approaching section of track A, and is between the post P and the signal house or box which contains electro-magnets M and signal apparatus D.

The magnet S can be employed to control or actuate any other semaphoric or visual signal, and magnet $S^1$ can control any other audible or alarm signal, and either of said magnets can control both a visual and audible signal, or can control devices which will alternately and rapidly close and break the primary circuit of an induction-coil, which can, by its secondary circuit, illuminate a Geissler or vacuum-tube, the said tube, when illuminated, indicating safety to the engineer of a locomotive or train.

The electro-magnet M, Figs. 1, 2, 3, 4, and 5, M or $M^1$, Fig. 6, M or $M^2$, Fig. 7, and $M^2$ $M^3$ or $M^4$ $M^5$, Fig. 8, can be arranged by various methods and devices so that levers $l$ will prolong the closing or breaking of the circuits shown and described, for a specified length of time after magnets have been charged by a locomotive or car connecting rails, and after said locomotive has passed over the short section of track, or circuit-closer C or $C'$. The electro-magnet M, Figs. 1, 2, 3, 4, 5, 6, 7, and M or $M^1$, Fig. 8, can also be employed to operate or control a visual or audible signal, or both, directly, and thereby dispense with local or secondary battery $B^2$ and electro-magnets S and $S^1$.

A galvanometer or any other suitable electrical apparatus can be substituted in place of electro-magnet M or $M^1$, and employed as an indicator or signal for the section of track A.

The Highton or any other suitable induction-coil apparatus can be used in connection with electro-magnet M or $M^1$, in order that the electrical current from battery B or $B^1$, passing over rails of section of track A, can be increased, and be made to act on said electro-magnet M or $M^1$ with greater energy.

The electro-magnet M or $M^1$, instead of being placed stationary along a railroad, or at a station, and causing a safety-signal to be displayed or sounded to the engineer of an approaching train, or a railroad employé at a station, can also be placed upon a locomotive or car, and by means of suitable devices upon the said locomotive or car, and along the railroad for closing and breaking circuit, the said electro-magnet M or $M^1$ upon locomotive or car while in motion can be arranged to be charged by the electrical current of battery B or $B^1$ flowing over the rails of section of track A when said section of track is clear, and cause a safety-signal to be displayed or sounded upon said locomotive or car.

Having now fully explained my invention, and the best methods in which I propose to apply the same for the purpose intended, I claim—

1. The combination of an insulated section of railway-track, the respective lines of rails of which are in continuous metallic connection, a galvanic battery having its poles connected respectively to opposite lines of rails of said section at one end thereof, an electro-magnet having one terminal of its coil connected to one line of rails of said section at the opposite end thereof, and its other terminal connected with a circuit-closer, which is electrically connected with the other line of rails at the same end of the section as is the first terminal, substantially as and for the purpose set forth.

2. The combination of rails R R$^1$ of insulated section A of railway-track, battery B, wires 1 2, rails R$^2$ R$^3$ of short insulated section of track C, wire 5, wires 3 4, electro-magnet M, and signal apparatus D or P, or both, substantially as described.

3. The combination of insulated or separated sections of single rails R R$^4$, short insulated sections of rails R$^2$ R$^6$, connected rails R$^1$ R$^7$ R$^3$ R$^5$, galvanic battery B, wires 1 2, galvanic battery B$^1$, wires 6 7, electro-magnet M, arranged to operate a signal or signals, wires 3 4, electro-magnet M$^2$, having armature-lever composed of parts $l\,l'$, insulated from each other, points $p\ p^1\ p^2\ p^3$, wires 8 9 5 10 11, resistance-coil Y, wire 12, electro-magnet M$^1$, arranged to operate a signal or signals, wire 13, circuit-closer O, and wires 14 and 15, substantially as and for the purpose set forth.

4. The combination of separated short rail-section R$^2$ of section C, connected rails R$^3$ R$^7$, wire 7, battery B$^1$, wire 6, separated rail R$^6$, wire 8, electro-magnet M$^2$, wire 9, lever $l$, points $p\ p^1$, wire 4, electro-magnet M, arranged to operate a signal or signals, wire 3, separated rail R of section of track A, wire 1, battery B, wire 2, and connected rail R$^1$, substantially as and for the purpose set forth.

5. The combination of electro-magnet M$^1$, arranged to operate a signal or signals, wire 13, separated rail R$^4$, wire 12, resistance-coil Y, wire 11, lever $l$, points $p^2\ p^3$, wire 10, separated rail R$^6$, wire 6, galvanic battery B$^1$, wire 7, connected rails R$^7$ R$^3$ R$^5$, wire 15, circuit closer and breaker O, and wire 14, substantially as and for the purpose set forth.

6. Rails R R$^1$ of insulated section of track A, having a galvanic battery, B, and electro-magnet M$^1$ arranged for controlling or operating a signal or signals connected therewith at one end, $b$, of said insulated section of track, and galvanic battery B$^1$, and electro-magnet M, arranged for controlling or operating a signal or signals connected therewith at the other end, $a$, of said insulated section of track, in combination with a circuit closer and breaker, or devices for closing and breaking circuit at each end $a$ and $b$ of said insulated section of track A, substantially as described, and for the purpose set forth.

7. Rails R R$^1$ of insulated section of track A, having galvanic battery B and electro-magnet M$^1$ arranged for controlling or operating a signal or signals connected therewith at one end, $b$, of said section of track, and galvanic battery B$^1$ and electro-magnet M arranged for controlling or operating a signal connected therewith at the other end, $a$, of said section of track, in combination with galvanic battery B$^2$ and electro-magnets M$^2$ M$^3$, (or one electro-magnet, M$^2$, with two levers or conductors, $l\,l'$, as in Fig. 7,) and rails R$^2$ R$^3$ of short section of track C; also with galvanic battery B$^3$, electro-magnets M$^4$ M$^5$, or one electro-magnet, M$^2$, and two levers, $l\,l'$, or conductors, and rails R$^4$ R$^5$ of section of track C', substantially as and for the purpose set forth.

8. The combination of electro magnet S, armature-lever E, slotted at its upper end and connected by a pin with lever H, bearing toothed sector I, pinion K, shaft $e^2$, weighted arm N, short arm $n$, and disk L, substantially as described.

9. The combination of spring O' with vibrating signal-disk L, as and for the purpose set forth.

10. The insulated switch-rail R$^4$, arranged to slide upon insulated plate H$^1$ for the purpose of being brought into line with either rail R$^6$ or R$^9$, which are electrically connected, substantially as and for the purpose set forth.

11. The combination of rails R$^9$ R$^{10}$ R$^{11}$ of siding or crossing section A$^2$, insulated at S$^2$ S$^2$, rails R$^7$ R$^8$ R$^6$ of section of track A, frog E, wire 9, plates H$^2$ H, and wires 1 2 of battery B, substantially as and for the purpose set forth.

12. Resistance-coils D D', in combination with rails R R$^1$ of insulated section of track A, (or with wires 3 5, and 1 2,) substantially as and for the purpose set forth.

13. The combination of rails R R$^1$ of insulated section of track A, wires 1 2, battery B, wires 3 5, electro-magnet M, wire 4, and rails R$^2$ R$^3$ of insulated section of track C, substantially as described.

14. Rails R R$^1$ of insulated section of track A, in combination with wires 1 2, battery B, wire 3, electro-magnet M, wire 4, and short insulated track-section C, or other circuit-closer, substantially as described.

15. Circuit closer and breaker or changer G, actuated by switch-rod $f'$, or its equivalent, in combination with rails R$^7$ R$^8$, plate H, wire 5, connecting-wire 9, or equivalent, rail R$^6$, wire 6, wire 7, insulated rail R, wire 3, electro-magnet M, wire 4, circuit-closing section of track C, or its equivalent, having metallic connection with rail R$^1$, substantially as and for the purpose set forth.

16. Insulated or separated section of track A$^2$ of branch track, or siding, or crossing at grade, in combination with rails of insulated section of main track A, battery B, magnet M, and short insulated section of track C, or other circuit-closer, substantially as and for the purpose set forth.

17. Rails R R$^1$ of insulated section of track A, in combination with wires 1 2, battery B, wires 3 5, magnet M, wire 4, electro-magnet M$^1$, wires 8 7, battery B$^2$, wire 6, and rails R$^2$ R$^3$ of section of track C or other circuit-closer, substantially as shown and described.

In testimony whereof I hereunto sign my name in presence of two subscribing witnesses.

HENRY W. SPANG.

Witnesses:
  C. T. SELLERS,
  C. A. HOMAN.